(12) United States Patent
Morgenshtein

(10) Patent No.: US 9,411,699 B1
(45) Date of Patent: Aug. 9, 2016

(54) PRIORITIZATION METRICS FOR EFFICIENT POST-SI FAILURE LOCALIZATION

(71) Applicant: International Business Machines Corporation, Armonk, NY (US)

(72) Inventor: Arkadiy Morgenshtein, Haifa (IL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/947,616

(22) Filed: Nov. 20, 2015

(51) Int. Cl.
*G06F 11/00* (2006.01)
*G06F 11/22* (2006.01)
*G06F 11/26* (2006.01)

(52) U.S. Cl.
CPC .......... *G06F 11/2273* (2013.01); *G06F 11/261* (2013.01)

(58) Field of Classification Search
CPC ........................................ G06F 11/2273–11/28
See application file for complete search history.

(56) References Cited

U.S. PATENT DOCUMENTS

| | | | |
|---|---|---|---|
| 6,539,498 B1 * | 3/2003 | Sato ...................... | G06F 11/277 714/38.11 |
| 8,832,502 B2 | 9/2014 | Dusanapudi et al. | |
| 8,990,622 B2 | 3/2015 | Landa et al. | |
| 2003/0208710 A1 * | 11/2003 | Martin-de-Nicolas ................ | G06F 11/263 714/736 |
| 2011/0087861 A1 | 4/2011 | Bertacco et al. | |
| 2014/0149800 A1 * | 5/2014 | Nishimaki .......... | G06F 11/2273 714/40 |
| 2015/0186251 A1 | 7/2015 | Friedler et al. | |

OTHER PUBLICATIONS

Friedler et al., "Effective Post-Silicon Failure Localization Using Dynamic Program Slicing", IEEEXPLORE, 2014, 6 pages.
Harman et al., "An Overview of Program Slicing", Retrieved from <URL: http://www0.cs.ucl.ac.uk/staff/mharman/sf.html.
Neishaburi et al., "On a New Mechanism of Trigger Generation for Post-Silicon Debugging", IEEE Transactions on Computers, vol. 63, No. 9, Sep. 2014, pp. 2330-2342.
Park et al., "BLoG: Post-Silicon Bug Localization in Processors using Bug Localization Graphs", DAC '10, Jun. 13-18, 2010, 6 pages.

(Continued)

*Primary Examiner* — Jason Bryan
(74) *Attorney, Agent, or Firm* — Cantor Colburn LLP; Gilad Mintzer-Magal

(57) ABSTRACT

A computer program product for provision of prioritization metrics for post-Si failure localization is provided. The computer program product includes a computer readable storage medium having program instructions embodied therewith. The program instructions are readable and executable by a processing circuit to cause the processing circuit to, receive an output of a failure localization tool applied to hardware verification debug processing, recognize, from the output, numbers of mis-compared resources to which each instruction of the failure localization tool is related, apply a priority gradient to each instruction based on the corresponding numbers of the mis-compared resources and conduct further debug processing with respect to each instruction in accordance with the applied priority gradient.

20 Claims, 10 Drawing Sheets

(56) References Cited

OTHER PUBLICATIONS

Surendran et al., "An Overview of Recent Trends in Software Testing", Global Journal of Computer Science and Technology: C Software & Data Engineering, 2014, vol. 14 Issue 8 Version 1.0, 23 pages.

Zhu et al., "Coverage-based Trace Signal Selection for Fault Localisation in Post-Silicon Validation", Proceedings of the 8th international conference on Hardware and Software: verification and testing, 2012, 17 pages.

\* cited by examiner

FIG. 7
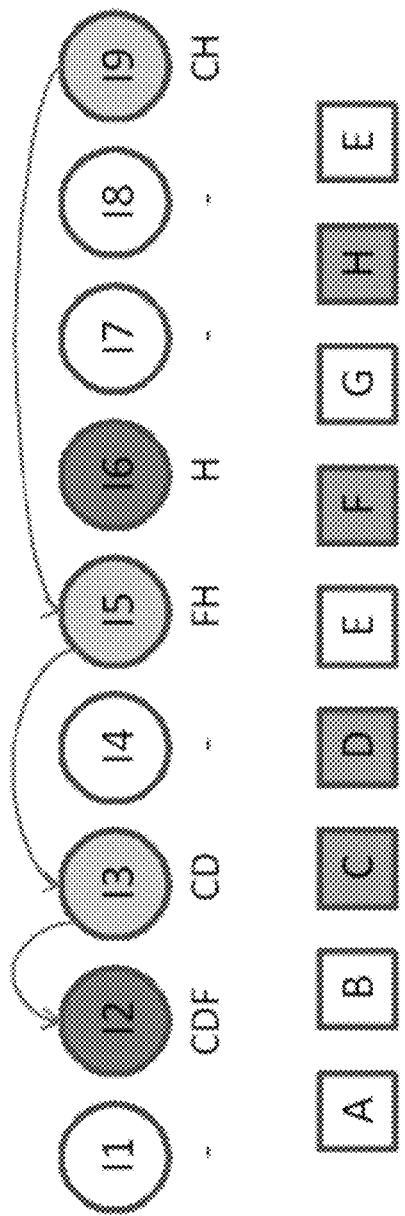
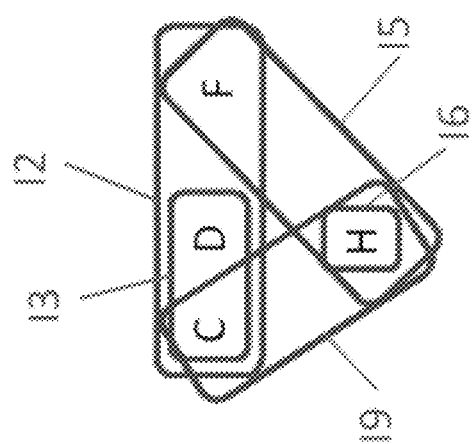

PRIORITIZATION METRICS FOR EFFICIENT POST-SI FAILURE LOCALIZATION

BACKGROUND

The present invention relates to failure localization and, more specifically, to prioritization metrics for efficient post-Si failure localization.

One of the most time consuming tasks in hardware (HW) verification processes is related to failure debug processing. The first stage of failure debug processing is failure localization and is mostly done manually and consumes significant time per each failing test. The task becomes especially challenging in post-Si verification processing, where knowledge of internal states is limited. Moreover, if the results of failure localization are incorrect or not sufficiently focused, the results can lead to wasted time and effort in subsequent debug processing based on failure location assumptions that are wrong.

Techniques have recently been developed for facilitating automation of failure localization processing and are often based on dynamic slicing techniques adopted from software (SW) debug domains. The techniques relate to simulations of tests on instruction-set simulators and build a dependency graph of the test instructions and resources. The techniques thus allow for automatic reporting of a set (or slice) of the test instructions that are related to the faulty resources at the end of the test.

The above-described techniques also incorporate justification heuristics that provide a reduced slice by filtering out instructions that are related to correct resources. However, the resulting slice still may still contain multiple instructions related to any faulty resource, without the ability to prioritize and further filter the findings.

SUMMARY

According to an embodiment of the present invention, a computer program product for provision of prioritization metrics for post-Si failure localization is provided. The computer program product includes a computer readable storage medium having program instructions embodied therewith. The program instructions are readable and executable by a processing circuit to cause the processing circuit to, receive an output of a failure localization tool applied to hardware verification debug processing, recognize, from the output, numbers of mis-compared resources to which each instruction of the failure localization tool is related, apply a priority gradient to each instruction based on the corresponding numbers of the mis-compared resources and conduct further debug processing with respect to each instruction in accordance with the applied priority gradient.

According to another embodiment of the present invention, a computing system for provision of prioritization metrics for post-Si failure localization is provided. The computing system includes a computer readable storage medium having instructions stored thereon that are executable by a processing circuit to cause the processing circuit to receive an output of a failure localization tool applied to hardware verification debug processing, recognize, from the output, numbers of mis-compared resources to which each instruction of the failure localization tool is related, apply a priority gradient to each instruction based on the corresponding numbers of the mis-compared resources and conduct further debug processing with respect to each instruction in accordance with the applied priority gradient.

According to yet another embodiment of the present invention, a computer-implemented method for provision of prioritization metrics for post-Si failure localization is provided and includes receiving an output of a failure localization tool applied to hardware verification debug processing, recognizing, from the output, numbers of mis-compared resources to which each instruction of the failure localization tool is related, applying a priority gradient to each instruction based on the corresponding numbers of the mis-compared resources and conducting further debug processing with respect to each instruction in accordance with the applied priority gradient.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

FIG. 7 is a depiction of failure localization processing with prioritization metrics in cases of multiple faulty instructions;

DETAILED DESCRIPTION

As will be described below, a system of metrics for prioritization of suspected instructions in a reduced slice are provided and allows for reporting of exact locations of failures within a given test. The system significantly improves analytical accuracy and avoids the expense of wasted effort due to a need for debugging of unrelated suspected instructions. The system can be applied to cases where a HW bug causes several faulty instructions to be executed and to SW debug domains as well. Generally, the system employs methods that are based on gathering visit and dependency info during a graph traversal at a slicing stage.

Figure 1:
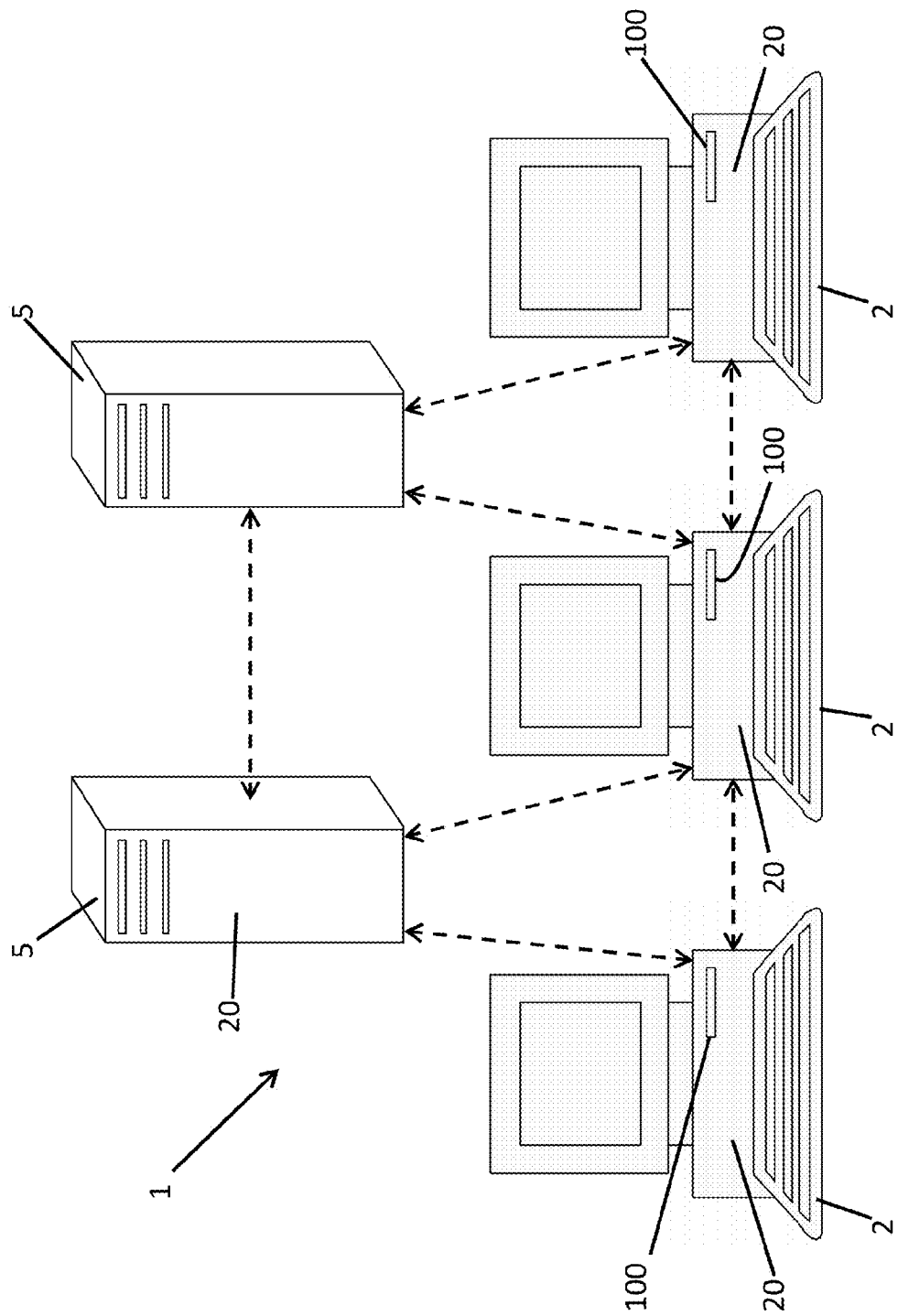
FIG. 1 is a schematic illustration of a computing system.

With reference to FIG. 1, a computing system 1 is provided for generation and deployment of the prioritization metrics and may be configured for example as an enterprise computing system or as a personal computing system. In either case, the computing system 1 includes multiple electronic devices 2 and, in some cases, at least one server 5. The multiple electronic devices 2 may include, but are not limited to, electronic devices of varying functionalities and size such as phones, tablets, watches, smart clothing, refrigerators, televisions, personal computers and appliances. In any case, the multiple electronic devices 2 and the server 5 are configured to be networked together for communication purposes. In accordance with embodiments, each of the multiple electronic devices 2 and the server 5 may include among other features a processing circuit 20 and a computer program product 100 (see FIG. 8) for managing a user's multiple electronic devices. They may also include a display, user input devices, a memory unit and a networking unit.

For each of the multiple electronic devices 2 and the server 5, the processing circuit 20 may be provided as a microprocessor, a central processing unit (CPU) or any other suitable processing device. The display may be provided as a monitor and is configured to display data and information as well as a graphical user interface to an administrator or user. The user input devices may be provided as a mouse and a keyboard combination and are configured to allow the administrator or user to input commands to the processing circuit 20. The networking unit may be provided as an Ethernet or other suitable networking device by which the multiple electronic devices 2 and the server 5 are communicative.

With reference to FIGS. 2-5, it is noted that slicing is currently performed by any one of the multiple computing devices 2 or the server 5 and is conducted by way of depth first search (DFS) traversal of a dependency graph that is built during test instruction set simulations (ISSs). The term "slicing" refers to program slicing in which a program slice is generated to include all of the instructions in a given test case. The DFS traversal is then conducted by starting an analysis from each of a set of faulty resources in a final state and marking every instruction that is related to that resource. Justification heuristics allow for the removal of instructions that are related to correct resources from the slice such that the resulting slice includes all the instructions related to any of the faulty resources and none of the correct resources.

Figure 2:
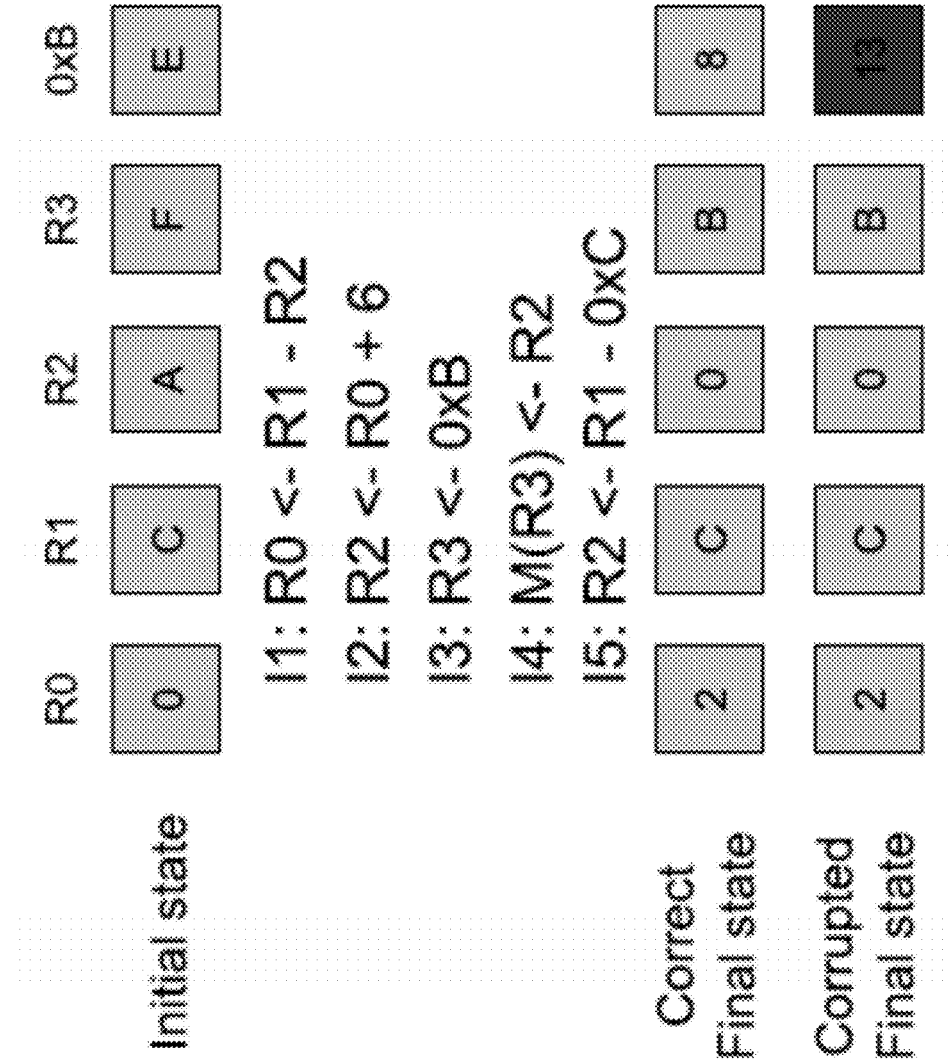
FIG. 2 is a depiction of a resource dependency graph.

At this point, a test-case example as shown in FIG. 2 is considered. The test-case includes five instructions (I1 ... I5) that use four registers (R0 ... R3) and one memory location at address 0xB. Running the test-case with the initial state of R0=0x0; R1=0xC; R2=0xA; R3=0xF; 0xB=0xE on a bug-free processor should always produce the correct final state of R0=0x2; R1=0xC; R2=0x0; R3=0xB; 0xB=0x8. However, if I2 erroneously writes the value thirteen instead of the value eight to R2 during the test-case execution, the wrong value will propagate until it will be written in memory at address 0xB and will appear at the final state of a test-case run.

The correct final state can be obtained by running the same test-case on an ISS. In the example, the memory resource 0xB will be identified as faulty based on the comparison of the final states of original test-case run on hardware and the ISS run. A tool was thus proposed to analyze a failing test-case while leveraging the information derived from comparisons of device-under-test (DUT) and ISS runs to identify a set of instructions that could lead to the faulty final state. This failure localization process includes a building of a resource dependency graph based on execution of the test-case on the ISS Instruction, a determining of a program slice of instructions that influence the faulty resource and a leveraging of the knowledge of the correct resources to reduce the set of suspicious instructions. This is done by traversing the dependency graph and marking the instructions that are related to the correct resources.

Figure 3:
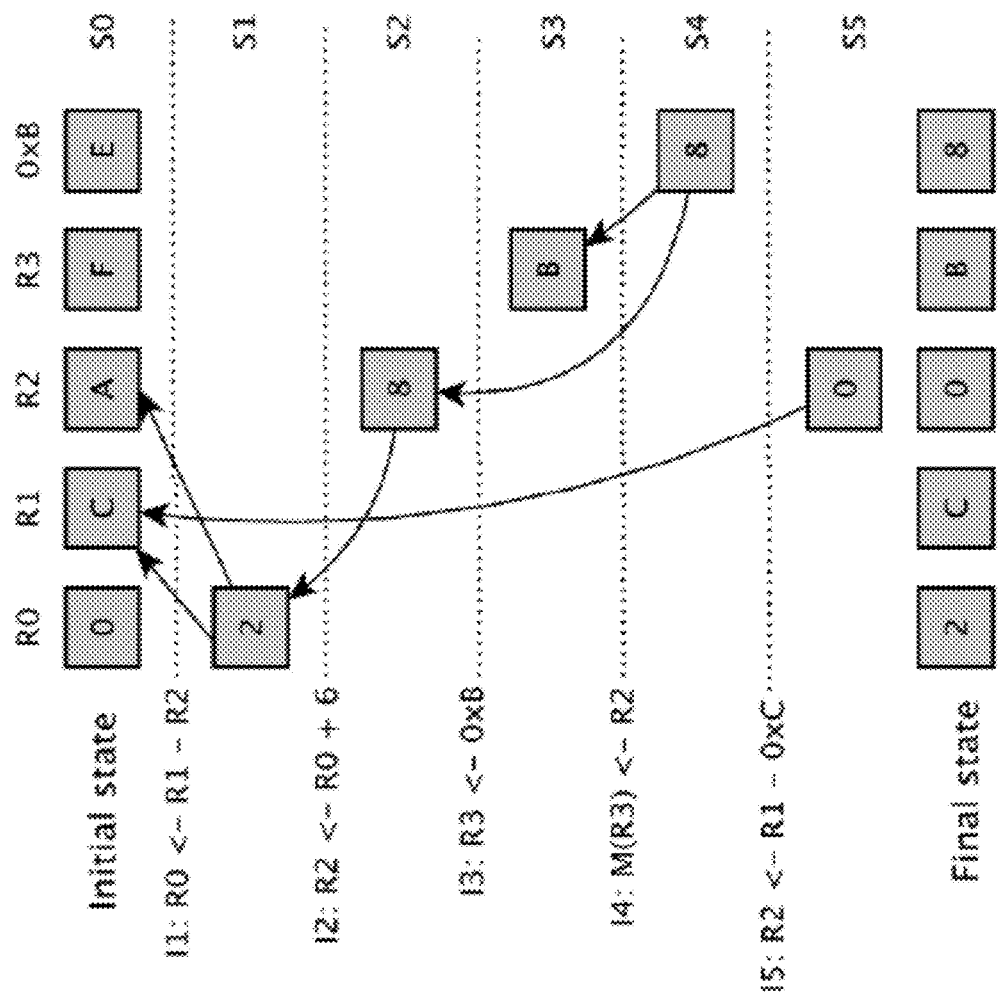
FIG. 3 is a depiction of a failure localization graph at an initial processing stage.

FIG. 3 depicts a resource dependency graph built by running the test-case in FIG. 2 on the ISS. Nodes in the graph are grouped in layers, with each layer representing a consistent architectural machine state. The first layer represents the initial state, S0, and the last layer represents the final state. Execution of each instruction moves the processor to the next architectural state. For example, execution of I2 moves the machine from S1 to S2. For the sake of clarity, at intermediate states, only the resources that are modified by the related instruction are depicted.

With continued reference to FIG. 3, it will be understood that as a general rule resource B is dependent on resource A if an instruction I exists with input A and output B. Such dependencies can be represented as edges between resources at two different layers of the dependency graph. For example, since I2 reads from R0 and writes to R2, R2 depends on R0. In addition, it will be further understood that the dependency graph is built based on the test-case execution on the ISS and the ISS eliminates any loops initially present in a test-case by unrolling the loops into a series of instructions per iteration so that by construction the dependency graph does not contain any loops.

In the second analysis stage, a program slice of instructions that affect the faulty resources is created. The faulty architectural resources are determined by running the test-case on the ISS and comparing values of architectural resources with the execution of the test-case on the DUT. To build a program slice, the dependency graph is DFS traversed starting from each faulty resource node at the final state (bottom layer). During the traversal, all the visited nodes at the intermediate states are marked as suspicious and a program slice is a set of all instructions that have at least one output resource that is marked as suspicious.

Figure 4:
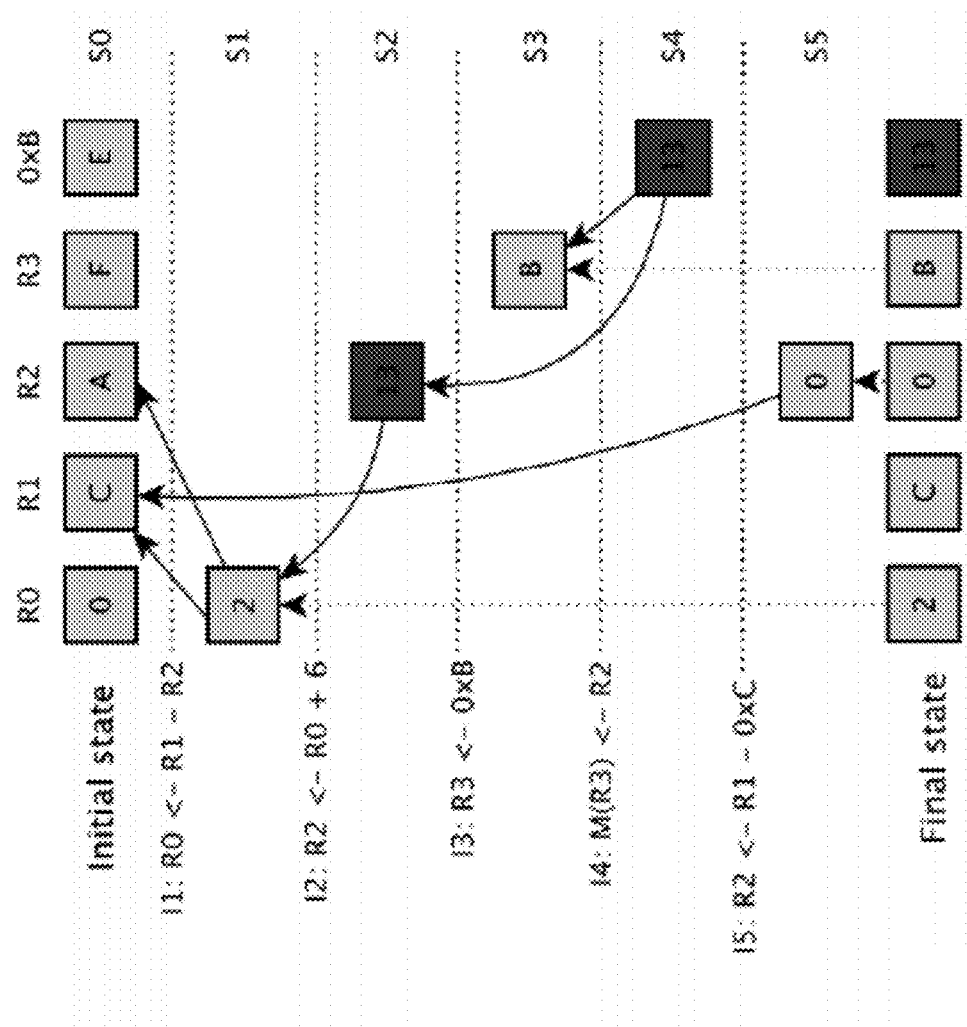
FIG. 4 is a depiction of a failure localization graph at an intermediate processing stage.

FIG. 4 depicts such graph traversal. The traversal starts at the final state of memory located at address 0xB. All marked nodes are darkened and the corresponding program slice includes instructions I1, I2, I3 and I4. As shown, the set of suspicious instructions contains the faulty instruction I2.

The dynamic program slice includes all the instructions in the test-case that affected the faulty resources. However, these instructions may also affect additional resources. Therefore, in the third analysis stage, the knowledge of the correct resources from the ISS run is leveraged by employment of a justification heuristic that further reduces the set of suspicious instructions.

Consider I3 from the example above. At the end of the slicing stage, I3 is part of the dynamic slice. However, had the DUT erred in executing I3, it would be expected that R3 (which is the output of I3) would have remained corrupt until the end of the test case. Since it is known that R3 holds a correct value at the end of the test-case, I3 can be removed from the list of suspicious instructions. This heuristic is implemented by running DFS traversals from each correct resource at the final state and by marking each node that is reached by the DFS traversals. If all resources associated with an instruction were marked, they are removed from the suspicious instructions list.

Figure 5:
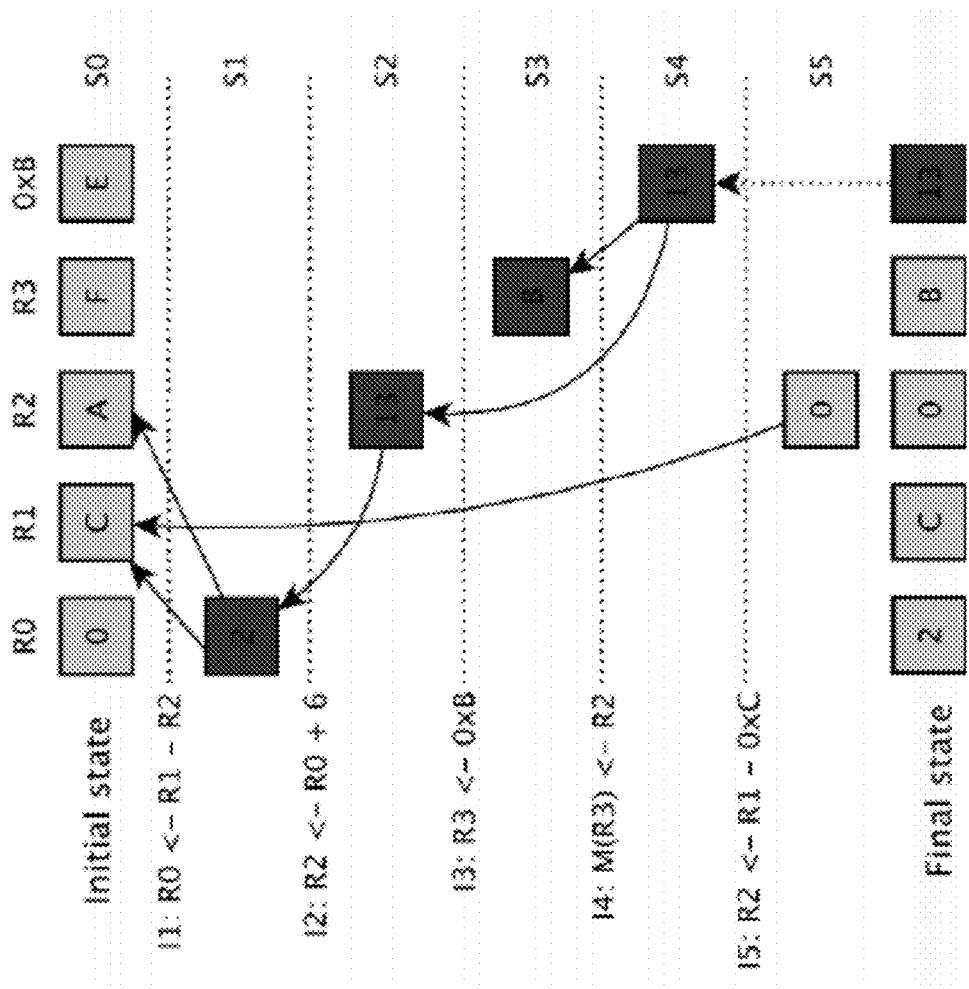
FIG. 5 is a depiction of a failure localization graph at a final processing stage.

FIG. 5 presents the dependency graph with nodes marked by the justification traversal shown in their original lightened state. At this point, the reduced set of suspicious instructions contains only instructions I2 and I4 with the remainder of the previously suspected instructions having been cleared by the justification traversal from the correct resources R0 and R3. Here, it is noted that the faulty instruction I2 is still in the final suspicious list.

With the above methods explained, it is usually the case that the reported slice cannot be further reduced in case of a single corrupted resource at the final state and that all of the reported instructions should be treated equally. However, in a case of a bug leading to multiple mis-compares in final state resources, the above-described methods may be misleading since each instruction may be related only to a sub-set of corrupted resources. In such cases, only those instructions that are related to all or most of the corrupted resources should be considered for further debugging. It is thus proposed that prioritization metrics be employed based on visit data from the DFS traversal. Such metrics can be defined by use of one (or a combination of one or more) of the following: storing traversal origins of each suspected instruction, counting the number of visits of each suspected instruction while traversing from the corrupted resources and analyzing the dependencies between the suspected instructions.

Figures 6A, 6B, 6C:
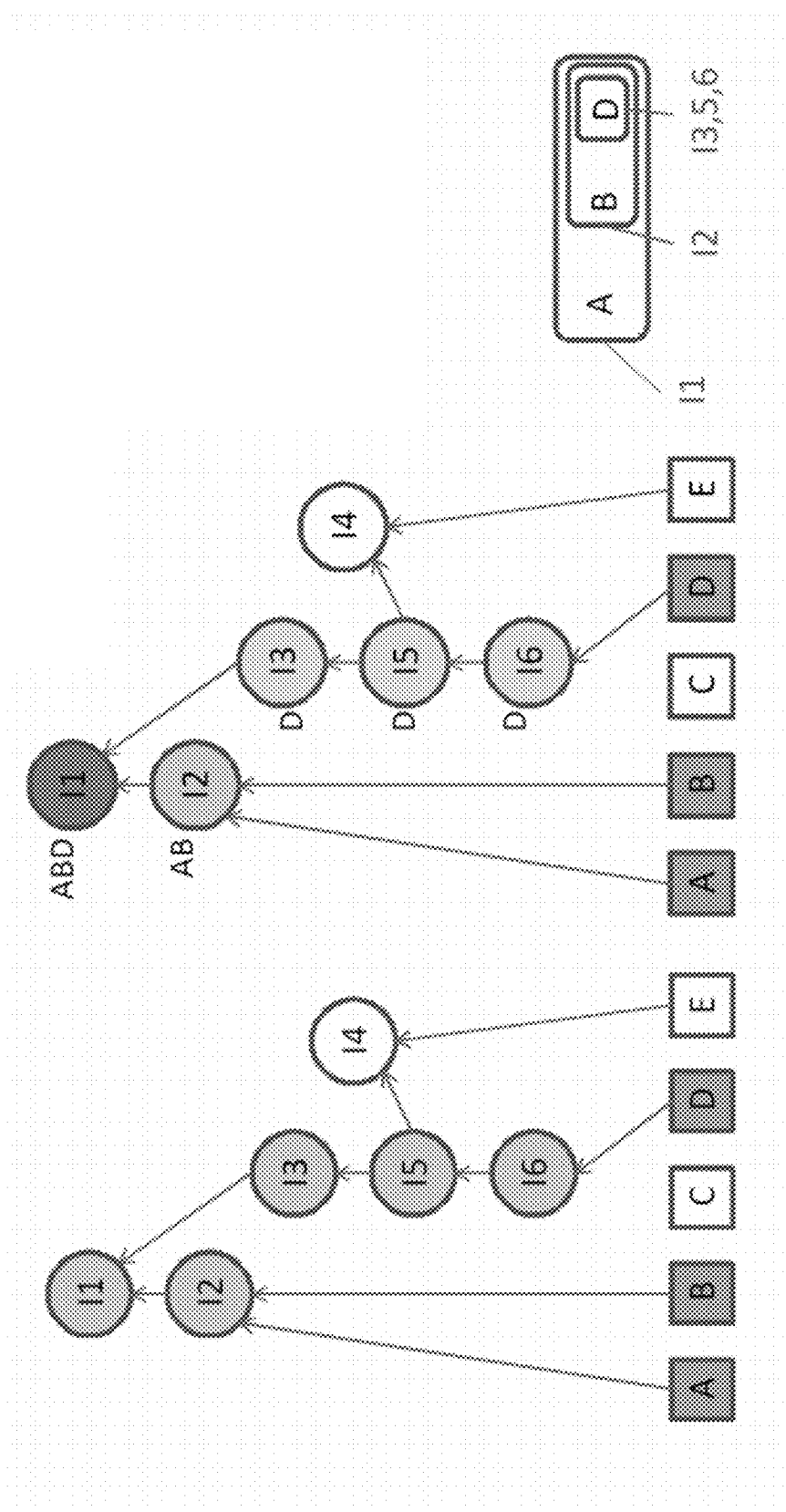
FIGS. 6A, 6B and 6C are depictions of failure localization graphs at various processing stages.

An example output of a failure localization tool is shown in FIGS. 6A, 6B and 6C. In this case, the failure localization algorithm (see FIG. 6A) may be represented with suspected instructions that are marked by traversal from corrupted resources A, B and D where all instructions are equally suspected. Here, the failure localization algorithm will report all the instructions that are related to any mis-compared resource. By defining a prioritization metric according to number of traversal origins (see FIG. 6B), it can be shown that instruction I1 is related to the highest number of corrupted resource including all three corrupted resources and should get the highest priority for further debug processing while the rest of the instructions should get lower priority. FIG. 6C illustrates a representation of suspected instructions by sets of corrupted resources from which the instruction was visited. In case of a set that includes all the sub-sets, two conclusions can be made. They are that the related instruction gets the highest priority and that this is a single faulty instruction in the test.

The approach of FIGS. 6A, 6B and 6C can be implemented by keeping the origin resource at the start of each back-traversal pass (at a final state of the graph) and, for each visited instruction, the traversal origin is added to a dedicated list. Also, the number of visits from each origin is maintained by incrementing a dedicated counter per origin. Number of visits, representing the number of paths connecting between the instruction and the corrupted resources can then be used as a secondary prioritization metric, along with the number of traversal origins.

In accordance with further embodiments, prioritization metrics are provided for tests with multiple bug expressions. A basic assumption of failure localization techniques is that there is a single faulty instruction in which a bug was expressed and that this single faulty instruction leads to one or more corrupted resources at a final state. Such techniques can be useful in analyses of failures with multiple faulty instructions as well as prioritization metrics can be developed to assist in identification and distinction of the multiple faulty instructions.

With reference to FIG. 7, faulty instructions I2 and I6 get awarded highest priorities by identifications of the sets that are not included in other sets, are not dependent and are jointly covering all the corrupted resources C, D, F and H.

For cases in which there is a single bug in a test that expresses itself in multiple faulty instructions, additional insights can be gathered by similarity analyses of suspected instructions in the possible sets covering all corrupted resources. Higher priority could be given to sets in which the instructions are of same type or are known for being related to same HW functionalities. In such cases, the findings could also provide insights on root causes of the bug within the design. Meanwhile, for cases exhibiting inter-pass resource initialization bugs that make all the instructions reading that resource faulty, additional insights can be gathered by common resource analyses of suspected instructions in the possible sets covering all corrupted resources. Higher priority could be given to sets in which the instructions have a common input resource. In such cases, the findings could also identify the resource being corrupted during the initialization stage.

In accordance with still other embodiments, prioritization metrics are provided for additional applications and can be used for providing insights beyond failure localization in data flow. Here, a minimal number of faulty instructions are identified and/or a minimal set of suspected instructions is identified in a speculative execution analysis. In the former case, a minimal group of instructions represented by sets that are not included in other sets, are not dependent and are jointly covering all the corrupted resources are identified and dependencies between the suspected instructions are stored during graph building or during the DFS traversal. In the latter case, groups of suspected instructions related to corrupted resources are identified. The suspected instructions are those which, if they were speculatively executed and erroneously not flushed, could cause corruptions in final state resources. There may be more than one possible group of suspected instructions that could be related to corrupted resources. The suspected groups can be analyzed by using prioritization metrics. A group containing a minimal number of instructions whose sets are jointly covering all corrupted resources will get the highest priority.

In accordance with still other embodiments, prioritization as a basis for further reduction of a suspected instructions set is provided. Here, filtering of suspected instructions based on the proposed prioritization metrics can serve as a basis for techniques for further slice reduction. Applications of these techniques would be costly in terms of runtime and performance without prior filtering based on prioritization metrics. Such techniques may include, for example, re-running of the test with error injection for each of the suspected instructions in order to localize failures based on comparisons of corrupted resources versus mis-compares observed in HW, applying masking reduction techniques to reveal evidence for any of the suspected instructions being the faulty one and applying data-based analysis to identify faulty instructions.

For the applying of the masking reduction techniques, a failure is localized by a changing of target resources of suspected instructions in case they were originally masked by subsequent instructions. The test case for each suspected instruction related to masked resources is modified (e.g. by using explicit instruction directives in template used for test generation) and the test is re-run for each modification whereupon a check is run to determine if new corrupted resources were observed at the final state due to modifications related to a specific instruction. If so, the suspected instruction is identified as the faulty one.

For the applying of the data-based analysis to identify the faulty instruction, a failure is localized by an injection of certain data values to source resources of a suspected instruction. The values may be results of another analysis (e.g., possible values in a resource shared by multiple threads). The test for each instruction is re-run and resulting values of the corrupted resources are compared to the values observed in HW.

Figure 8:
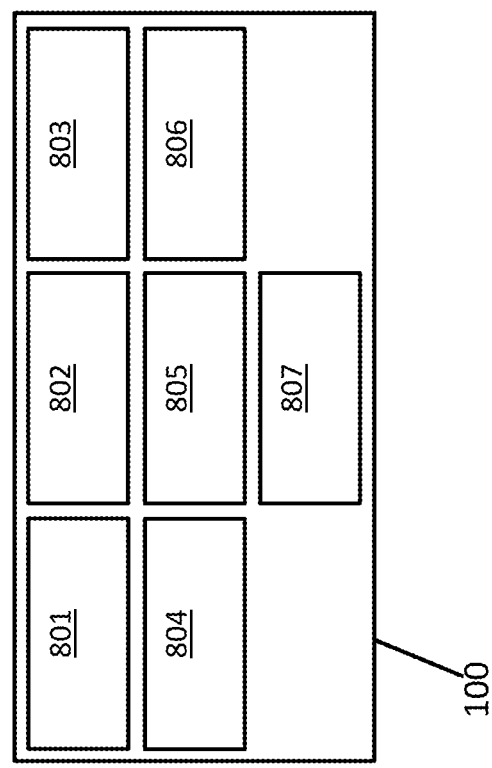
FIG. 8 is a schematic diagram illustrating a computer program product in accordance with embodiments.

With reference to FIG. 8, the computer program product 100 includes a computer readable storage medium and may be installed in a memory unit of each of the multiple electronic devices 2 and the server 5 as firmware or as lower level executable program instructions. In accordance with embodiments, the computer program product 100 may include first-seventh program instructions 801-807 that are readable and executable by the processing circuit 20 (of any one or more of the multiple electronic devices 2 and the server 5) to cause the processing circuit 20 to execute certain functionalities. In accordance with embodiments, the first-fourth program instructions 801-804 are executable by the processing circuit 20 to respectively receive an output of a failure localization tool applied to hardware verification debug processing, recognize, from the output, numbers of mis-compared resources to which each instruction of the failure localization tool is related, apply a priority gradient to each instruction based on the corresponding numbers of the mis-compared resources (e.g., by applying a highest priority to an instruction related to a highest number of mis-compared resources) and conduct further debug processing with respect to each instruction in accordance with the applied priority gradient.

In accordance with further embodiments, the fifth program instructions 805 are executable by the processing circuit 20 to cause the processing circuit 20 to adjust the applied priority gradient based on a number of instruction-resource paths for each instruction, to adjust the applied priority gradient based on a similarity between multiple instructions and/or to adjust the applied priority gradient based on a multiple instructions having a common input resource. The sixth program instructions 806 are executable by the processing circuit 20 to cause the processing circuit 20 to apply the priority gradient toward identification of at least one of minimal numbers of faulty instructions and minimal sets of suspected instructions. The seventh program instructions 807 are executable by the processing circuit 20 to cause the processing circuit 20 to re-run the failure localization tool applied to the hardware verification debug processing with error injection for each suspected instruction, apply masking reduction techniques to reveal evidence for any suspected instruction being faulty and apply data-based analysis to identify a faulty instruction.

Figure 9:
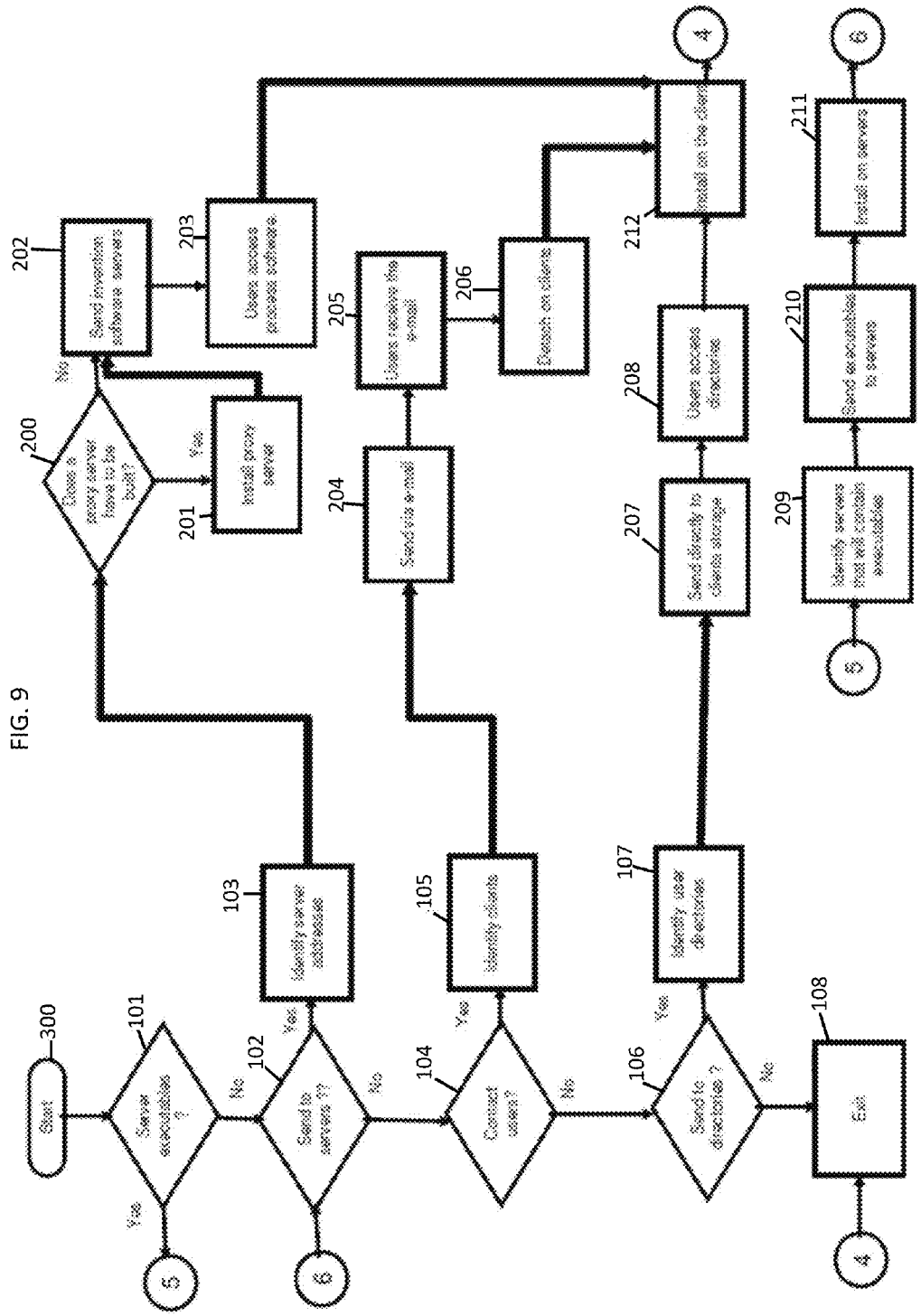
FIG. 9 is a flow diagram illustrating a deployment process of the computer program product of FIG. 9.

In accordance with embodiments, and with reference to FIG. 9, a deployment process of the computer program product described above is provided. The process begins at block 300 and at block 101 with a determination of whether the first-seventh program instructions 801-807 will reside on server 5 when executed. If so, then the server 5 is identified at block 209. The first-seventh program instructions 801-807 are then transferred directly to the server 5 storage via FTP or some other protocol or by copying though the use of a shared file system at block 210 such that the first-seventh program instructions 801-807 are installed on the servers at block 211.

Next, a determination is made on whether the first-seventh program instructions 801-807 are to be deployed by having users access to the first-seventh program instructions 801-807 on server 5 at block 102. If so, the server 5 addresses that will store the first-seventh program instructions 801-807 are identified at block 103 and a determination is made if a proxy server is to be built at block 200 for storage. A proxy server is a server that sits between a client application, such as a Web browser, of first computing device 2 and server 5 and operates by intercepting all requests to the server 5 to see if it can fulfill the requests itself. If not, the proxy server forwards the request to server 5. The two primary benefits of a proxy server are to improve performance and to filter requests.

If a proxy server is required, then the proxy server is installed at block 201 and the first-seventh program instructions 801-807 are sent via a protocol, such as FTP, or by being copied directly from the source files to the server 5 files via file sharing at block 202. Another embodiment involves sending a transaction to the (one or more) server 5 that contained the process software, and have the server 5 process the transaction and then receive and copy the process software to the server 5 file system. Once the process software is stored, the users may then access the first-seventh program instructions 801-807 and copy to the same to their respective client computer file systems at block 203. Alternatively, the server 5 may automatically copy the first-seventh program instructions 801-807 to each client and then run an installation program for the first-seventh program instructions 801-807 on each client computer whereby the user executes the program that installs the first-seventh program instructions 801-807 on his client computer at block 212 and then exits the process at block 108.

At block 104, a determination is made as to whether the first-seventh program instructions 801-807 are to be deployed by being sent to users via e-mail. If a result of the determination is affirmative, the set of users are identified together with the addresses of the user client computers at block 105 and the first-seventh program instructions 801-807 are sent via e-mail to each of the users' client computers. The users then receive the e-mail at block 205 and detach the first-seventh program instructions 801-807 from the e-mail to a directory on their client computers at block 206. The user executes the program that installs the first-seventh program instructions 801-807 on his client computer at block 212 and then exits the process at block 108.

Lastly, a determination is made on whether the first-seventh program instructions 801-807 will be sent directly to user directories on their client computers at block 106. If so, the user directories are identified at block 107 and the process software is transferred directly to the user's client computer directories at block 207. This can be done in several ways such as, but not limited to, sharing the file system directories and then copying from the sender's file system to the recipient user's file system or, alternatively, using a transfer protocol such as File Transfer Protocol (FTP). The users access the directories on their client file systems in preparation for installing the first-seventh program instructions 801-807 at block 208, execute the program that installs the first-seventh program instructions 801-807 at block 212 and then exit the process at block 108.

Figure 10:
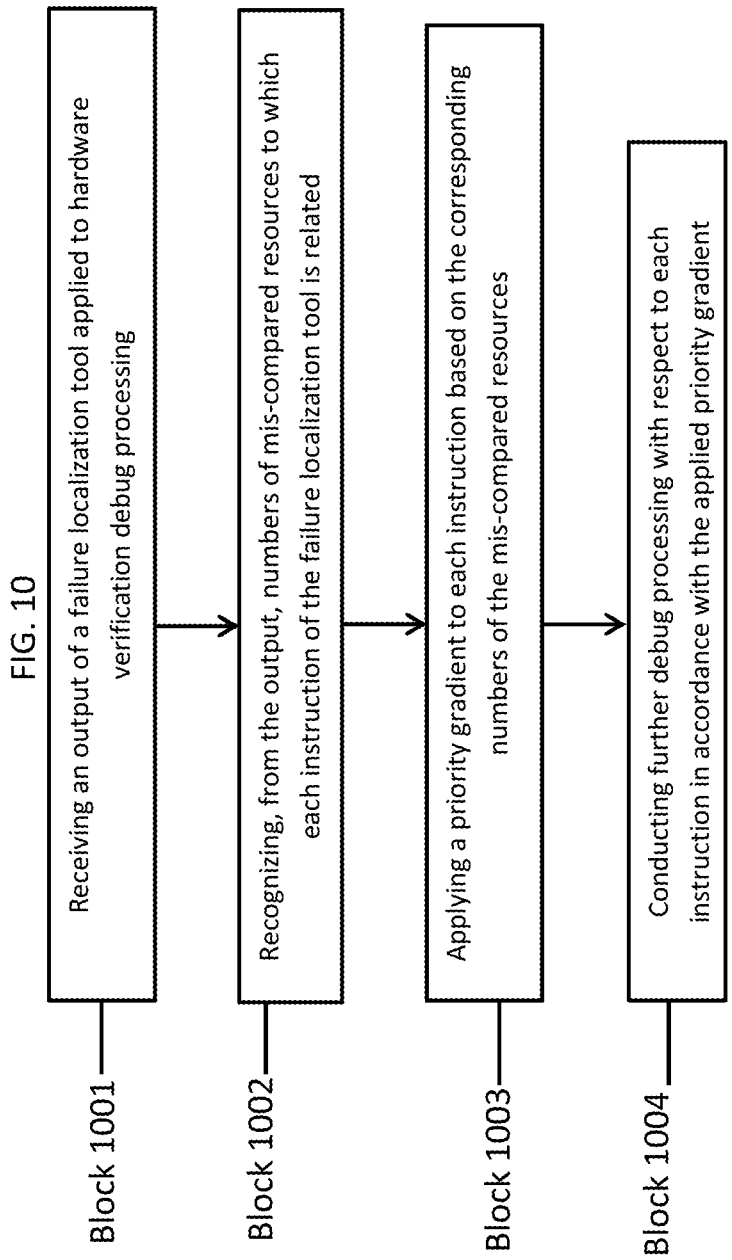
FIG. 10 is a flow diagram illustrating a computer-implemented method for provision of prioritization metrics for post-Si failure localization.

With reference to FIG. 10, a computer-implemented method for provision of prioritization metrics for post-Si failure localization is provided. The computer-implemented method includes at least receiving an output of a failure localization tool applied to hardware verification debug processing at block 1001, recognizing, from the output, numbers of mis-compared resources to which each instruction of the failure localization tool is related at block 1002, applying a priority gradient to each instruction based on the corresponding numbers of the mis-compared resources at block 1003 and conducting further debug processing with respect to each instruction in accordance with the applied priority gradient at block 1004.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer-implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer program product for provision of prioritization metrics for post-Si failure localization, the computer program product comprising a computer readable storage medium having program instructions embodied therewith, the program instructions being readable and executable by a processing circuit to cause the processing circuit to:
   receive an output of a failure localization tool applied to hardware verification debug processing;
   recognize, from the output, numbers of mis-compared resources to which each instruction of the failure localization tool is related;
   apply a priority gradient to each instruction based on the corresponding numbers of the mis-compared resources; and
   conduct further debug processing with respect to each instruction in accordance with the applied priority gradient.

2. The computer program product according to claim 1, wherein the program instructions further cause the processing circuit to apply a highest priority to an instruction related to a highest number of mis-compared resources.

3. The computer program product according to claim 1, wherein the program instructions further cause the processing circuit to adjust the applied priority gradient based on a number of instruction-resource paths for each instruction.

4. The computer program product according to claim 1, wherein the program instructions further cause the processing circuit to adjust the applied priority gradient based on a similarity between multiple instructions.

5. The computer program product according to claim 1, wherein the program instructions further cause the processing circuit to adjust the applied priority gradient based on a multiple instructions having a common input resource.

6. The computer program product according to claim 1, wherein the program instructions further cause the processing circuit to apply the priority gradient toward identification of at least one of minimal numbers of faulty instructions and minimal sets of suspected instructions.

7. The computer program product according to claim 1, wherein the program instructions further cause the processing circuit to:
   re-run the failure localization tool applied to the hardware verification debug processing with error injection for each suspected instruction;
   apply masking reduction techniques to reveal evidence for any suspected instruction being faulty; and
   apply data-based analysis to identify a faulty instruction.

8. A computing system for provision of prioritization metrics for post-Si failure localization, the computing system comprising a computer readable storage medium having instructions stored thereon that are executable by a processing circuit to cause the processing circuit to:
   receive an output of a failure localization tool applied to hardware verification debug processing;
   recognize, from the output, numbers of mis-compared resources to which each instruction of the failure localization tool is related;
   apply a priority gradient to each instruction based on the corresponding numbers of the mis-compared resources; and
   conduct further debug processing with respect to each instruction in accordance with the applied priority gradient.

9. The computing system according to claim 8, wherein the instructions further cause the processing circuit to apply a highest priority to an instruction related to a highest number of mis-compared resources.

10. The computing system according to claim 8, wherein the instructions further cause the processing circuit to adjust the applied priority gradient based on a number of instruction-resource paths for each instruction.

11. The computing system according to claim 8, wherein the instructions further cause the processing circuit to adjust the applied priority gradient based on a similarity between multiple instructions.

12. The computing system according to claim 8, wherein the instructions further cause the processing circuit to adjust the applied priority gradient based on a multiple instructions having a common input resource.

13. The computing system according to claim 8, wherein the instructions further cause the processing circuit to apply the priority gradient toward identification of at least one of minimal numbers of faulty instructions and minimal sets of suspected instructions.

14. The computing system according to claim 8, wherein the instructions further cause the processing circuit to:
   re-run the failure localization tool applied to the hardware verification debug processing with error injection for each suspected instruction;
   apply masking reduction techniques to reveal evidence for any suspected instruction being faulty; and
   apply data-based analysis to identify a faulty instruction.

15. A computer-implemented method for provision of prioritization metrics for post-Si failure localization, comprising:
   receiving an output of a failure localization tool applied to hardware verification debug processing;
   recognizing, from the output, numbers of mis-compared resources to which each instruction of the failure localization tool is related;
   applying a priority gradient to each instruction based on the corresponding numbers of the mis-compared resources; and
   conducting further debug processing with respect to each instruction in accordance with the applied priority gradient.

16. The computer-implemented method according to claim 15, further comprising applying a highest priority to an instruction related to a highest number of mis-compared resources.

17. The computer-implemented method according to claim 15, further comprising adjusting the applied priority gradient based on a number of instruction-resource paths for each instruction.

18. The computer-implemented method according to claim 15, further comprising:
   adjusting the applied priority gradient based on a similarity between multiple instructions; and
   adjusting the applied priority gradient based on a multiple instructions having a common input resource.

19. The computer-implemented method according to claim 15, further comprising applying the priority gradient toward identification of at least one of minimal numbers of faulty instructions and minimal sets of suspected instructions.

20. The computer-implemented method according to claim 15, further comprising:
   re-running the failure localization tool applied to the hardware verification debug processing with error injection for each suspected instruction;

applying masking reduction techniques to reveal evidence for any suspected instruction being faulty; and applying data-based analysis to identify a faulty instruction.

\* \* \* \* \*